Patented Aug. 15, 1933

1,922,919

UNITED STATES PATENT OFFICE 1,922,919

PROCESS FOR PREPARING POULTRY FOOD

Komao Yamamoto, Tokyo, Japan

No Drawing. Application November 5, 1930
Serial No. 493,696

2 Claims. (Cl. 167—53)

This invention relates to the process for preparing poultry food consisting in sulphate of iron and silicate of soda respectively dissolved in water and mixed together, and the paste-like liquid obtained which consists chiefly of silicate of iron in gel form is added to corn or any other poultry food.

The object of the invention is to provide poultry food especially adapted for chicken, pigeon and like other domestic fowls to improve their health, to avoid from being affected by disease, to lay eggs of big and excellent quality and to produce healthy young chickens therefrom.

In modern poultry farming a number of chickens are kept in barricade in a limited space and they are apt to be affected by disease. The yolk of their eggs becomes pale and the young ones produced from such eggs are not so healthy as from those kept at large. It is already known that iron scraps placed in the drinking water of fowls or sulphate of iron added to poultry food brings some good effects both on the health and the eggs in lays, but these remedies are not yet enough for the relief of fowls kept in the barricade. The colour of the yolks of eggs may be thickened by addition of dyes to the food but this process gives nothing to the health of the poultry.

According to the present invention silicate of iron in gel form is added to poultry food. Sulphate of iron and silicate of soda respectively dissolved in water are mixed together. Sulphate of soda produced is removed therefrom and a paste-like liquid containing silicate of iron in gel form is obtained, which is thoroughly mixed with poultry food. It is found from experiment that by the addition of said liquid to the poultry food, fowls kept in barricade are improved of their health, the colour of yolk of their eggs becomes richer, the yolk and the inner layer of the white of eggs is rendered dense, and the young chickens produced from such eggs are excellent in health in comparison with those produced from ordinary eggs. The number of eggs in lay are also increased by the application of the present invention.

An example of carrying out the present invention is explained. 1 lb. of ferrous sulphate crystals and 1 lb. of silicate of soda (containing 20% of oxide of soda) are respectively dissolved in ½ gallon of water and the solutions are mixed together. The mixture is then filtered to remove sulphate of soda and a paste-like liquid is obtained. Sulphate of soda is preferably removed from the solution as it gives no useful result to poultry and in view of obtaining a paste rich in silicate salt, 1 oz. of said paste dissolved in suitable quantity of water is added to 300 to 600 lbs. of corn to be thoroughly mixed for being used as poultry food.

Having now particularly described and ascertained the nature of my said invention and in what manner the same is to be performed I declare that what I claim is:—

1. In a process for improving poultry food, the step of adding to the food a suitable quantity of iron silicate in gel form.

2. In a process for improving poultry food, mixing together iron sulphate and sodium silicate, removing from the resulting iron silicate in gel form the sodium sulphate produced during reaction, and adding to poultry food a suitable quantity of said iron silicate gel.

KOMAO YAMAMOTO.